United States Patent [19]

Sweig

[11] Patent Number: 4,584,157
[45] Date of Patent: Apr. 22, 1986

[54] METHOD FOR DOUBLE-SIDE THERMOFORMING

[75] Inventor: Stephen J. Sweig, Buffalo Grove, Ill.

[73] Assignee: Arrem Plastics, Inc., Addison, Ill.

[21] Appl. No.: 737,820

[22] Filed: May 23, 1985

Related U.S. Application Data

[63] Continuation of Ser. No. 488,110, Apr. 25, 1983, abandoned.

[51] Int. Cl.$^4$ .................. B29C 51/10; B29C 59/02
[52] U.S. Cl. ............................. 264/522; 264/547; 264/549; 264/293; 264/296
[58] Field of Search ............ 264/509, 522, 547–551, 264/553, 554, 293, 296

[56] References Cited

U.S. PATENT DOCUMENTS

| | | | |
|---|---|---|---|
| 2,990,581 | 7/1961 | Rowe | 264/549 |
| 3,074,110 | 1/1963 | Mard et al. | 264/550 |
| 3,337,664 | 8/1967 | Lyon | 264/296 |
| 3,487,139 | 12/1969 | Mojonnier et al. | 264/296 |
| 3,535,740 | 10/1970 | Frowde | 264/548 |
| 3,606,063 | 9/1971 | Childs | 264/547 |
| 3,651,185 | 3/1972 | Menkel | 264/544 |

Primary Examiner—Jan Silbaugh
Attorney, Agent, or Firm—Wood, Dalton, Phillips, Mason & Rowe

[57] ABSTRACT

A method for double-side thermoforming opposite faces of a sheet of plastic is set forth. The method includes heating the sheet to a temperature within its transition range and forming one face of the sheet into the desired pattern by bringing a contour-forming first surface into contact with the face. After contact has been made, a pressure differential is imposed to cause the one face to be formed by and freeze-off to the contour of the first surface. After one face of the sheet has been formed, a second contour-forming surface is positioned adjacent to the other face of the plastic sheet. Producing a pressure differential between the opposite faces of the plastic sheet causes the other face to be formed by and freeze-off into the desired pattern imposed by the second contour-forming surface resulting in the desired plastic part. The present invention also includes a plastic part fashioned according to the aforesaid method.

7 Claims, 15 Drawing Figures

METHOD FOR DOUBLE-SIDE THERMOFORMING

This is a continuation of application Ser. No. 488,110, filed April 25, 1983, now abandoned.

BACKGROUND OF THE INVENTION

1. Field of the Invention

This invention relates to plastic molding and more particularly thermoforming of both sides of plastic.

2. Description of the Prior Art

To mold both sides of plastic parts basically three methods have been used. These methods are compression molding, injection molding, and thermoforming. In compression molding the plastic is stamped by cooperative mold blocks to achieve the desired contour and shape. As can be appreciated, the cooperative mold blocks must be ruggedly built to withstand the pressures required to properly form the plastic. To shape or pattern both sides of the plastic the mold blocks must also be precision manufactured to properly mate and form the desired surface contour. The requirement of precision and ruggedness results in relatively expensive mold blocks and compression molding machines. Where translucent or transparent plastic parts are desired, compression molding has been found to produce defects in the finished part resulting from the stamping process commonly referred to as squeeze marks. Additionally, the configuration of the part and the shape of the faces of the part are constrained by the draft angle necessary to bring the mold blocks together and to remove the part therefrom.

In injection molding the plastic is heated to a liquid state and is injected into a mold to form the desired part and its surfaces. Again, precision, rugged molds must be provided to receive and hold the liquified plastic usually at high pressure until it solidifies. Accordingly, these molds are expensive. Without the use of expensive articulated tooling, the shape of the part and configuration of the surfaces are constrained by the draft angle required for removal of the completed part from the mold. For example, any ribs, fins or the like can normally only be arranged in the direction which the part is removed from the mold.

One type of thermoforming is exemplified by Stratton, Jr., U.S. Pat. No. 2,973,558 issued Mar. 7, 1961. In conventional thermoforming, a sheet of thermoplastic is heated to temperature sufficiently soft for stretching and forming. A heated assist plug, cushioned by compressed air, displaces the heated plastic into a mold cavity adapted to mold the desired finished part. Evacuating air from the cavity imposes a pressure differential to stretch the heated plastic sheet to conform to the wall of the mold cavity. The plastic cools and hardens in the cavity to the desired shape.

To impose a pattern or mold on one face or side of the plastic, the mold cavity may be suitably designed. However, where both sides require non-complimentary patterns, one side must be prepatterned prior to molding. As is often the case, the heating and molding of the part distorts or destroys the prepattern detracting from the utility of the finished part.

SUMMARY OF THE INVENTION

It is an object of the present invention to overcome one or more of the drawbacks noted above.

Toward this end, a method for thermoforming both faces (hereinafter referred to as double-side thermoforming) of plastic stock is set forth wherein neither precision, rugged mold blocks nor prepatterning of the part is required. Also set forth is a plastic part formed according to the aforesaid method.

Accordingly, the method for molding opposite faces of plastic stock, in particular, a sheet of plastic, includes heating the sheet to its transition temperature, i.e., the temperature within the range of temperatures wherein the sheet can be plastically deformed and formed by differential pressure. After the plastic has been heated, one face of the sheet is formed into a desired pattern by bringing a contour-forming first surface into contact with the face. After contact has been made, a pressure differential is imposed to cause the one face to conform with the first surface and harden or freeze-off. The freeze-off of the one face does not harden or freeze-off the other face of the sheet. After one face of the sheet has been formed, a second contour-forming surface is brought into a position adjacent the other face of the plastic sheet. These two contour-forming surfaces are separated by clearances in excess of the thickness of the plastic stock. Producing a pressure differential between the opposite faces of the plastic sheet causes the plastic sheet to further plastically deform, moving it across the clearances between the two contour-forming surfaces, out of contact with the first contour-forming surface and into contact with the second contour-forming surface. This same pressure differential between the opposite faces of the plastic sheet causes the second face to conform with the desired pattern by the second contour forming surface and freeze-off resulting in the desired plastic part.

The present invention also includes a plastic part fashioned according to the aforesaid method.

Accordingly, it is an object of the present invention to set forth a method for double side thermoforming wherein both faces of plastic stock are thermoformed without requiring one face to be prepatterned.

It is another object of the present invention to set forth a method for thermoforming both faces of plastic stock wherein no draft is required and where ribs, fins or the like can be formed at various orientations on the faces.

It is still a further object of the present invention to set forth a plastic part fashioned according to the method of the present invention.

Further objects and advantages of the present invention will become apparent upon a reading of the specification, drawings and claims.

DESCRIPTION

Figure 1:
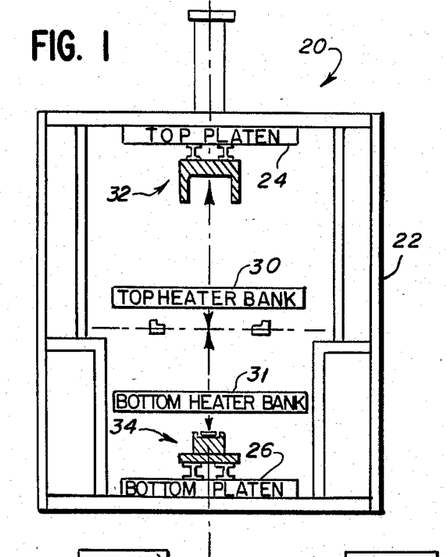
FIG. 1 is a schematic front view of a machine for accomplishing the method of the present invention.
Figure 2:
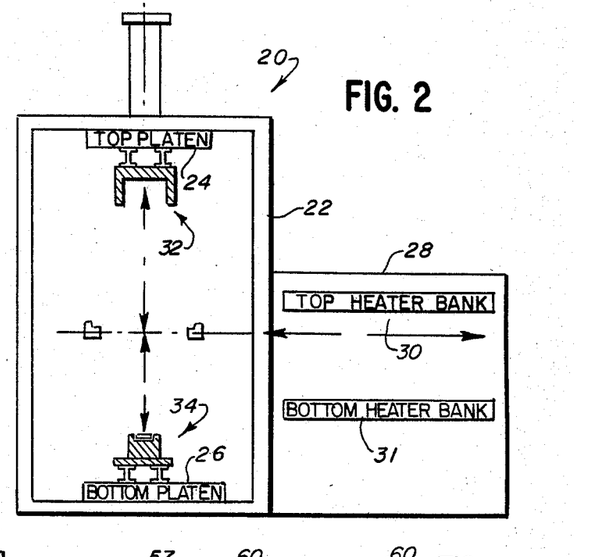
FIG. 2 is a side view of the machine of FIG. 1.

Turning to FIGS. 1 and 2, a molding machine 20 is shown for double-side thermoforming of plastic according to the present invention. The machine 20 has a frame 22 supporting movable top and bottom platens 24 and 26, respectively. As will be described in detail below, the top and bottom platens 24, 26 are movable toward one another to fashion the plastic into the desired finished plastic part.

The machine 20 has an oven 28 with a top heater bank 30 and a bottom heater bank 31 for heating the plastic as described in detail below.

Figure 14:
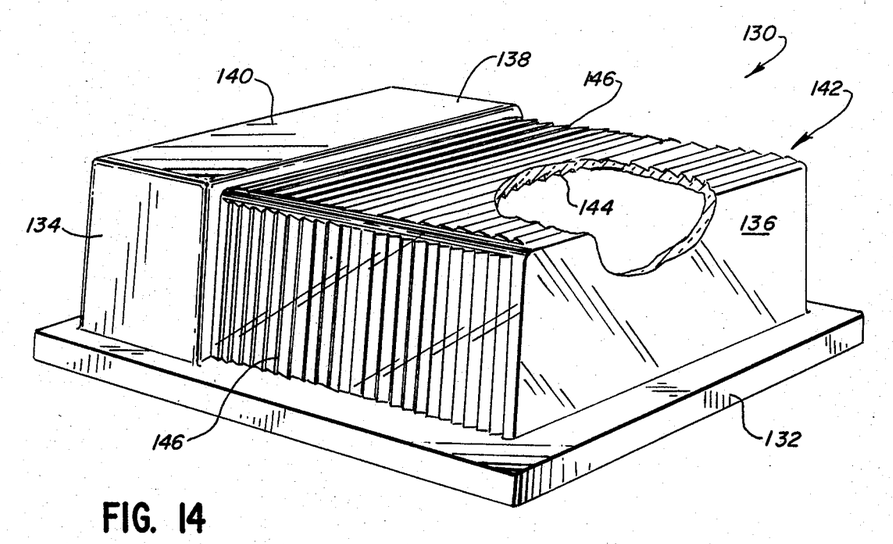
FIG. 14 is an exemplary thermoformed plastic part molded according to the method of the present invention with a portion broken away to show the two formed surfaces.

The machine 20 double-side thermoforms a plastic part such as a cover 130 shown in FIG. 14. The cover 130 is designed to be attached to a light fixture (not shown) to protect the internals of the fixture and diffuse the light emitted therefrom. Accordingly, the cover 130 has a flange 132 for attaching the cover 130 to the fixture, upstanding side panels 134 (only one shown), bottom panel 136, and top panel (not shown). A front panel 138 extends between the remaining panels to give the cover 130 a box-like shape having outer and inner surfaces. A portion of the side panels 134 and front panel 138 cooperates to define and opaque cap 140 to hide electrical components and enhance the appearance of the cover 130. The remainder of the side and front panels 134 and 138 and the bottom panels define a translucent light diffusing lens 142.

To diffuse the light passing through the lens 142, a plurality of prisms 144 extend along the inner surface of the front panel 138. To further diffuse the light, the outer surfaces of the side and front panels 134 and 138 have a number of prisms 146 arranged transverse to prisms 144.

While the following description is directed to double-side thermoforming of the cover 130 of FIG. 14, it will be apparent that the following method is applicable to a wide variety of plastic products.

Figures 3, 3A, 4, 5:
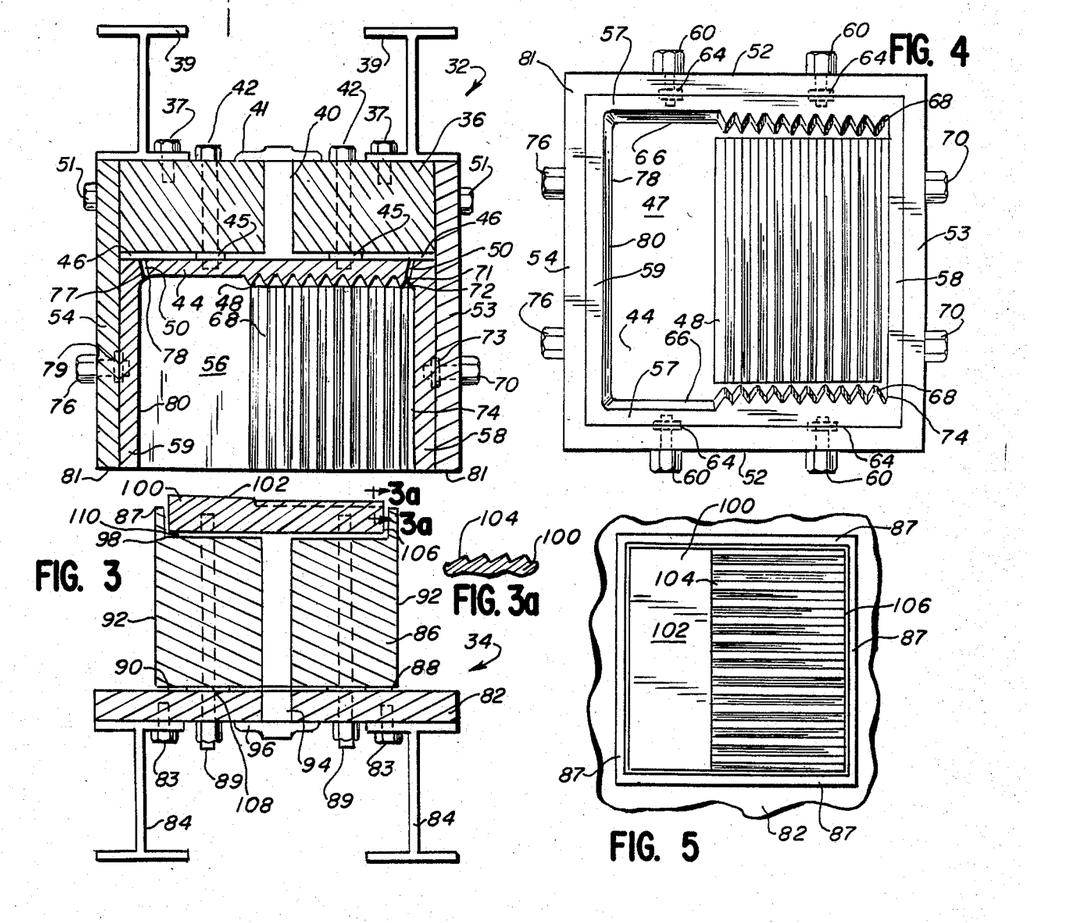
FIG. 3 is a section view of the molding assemblies of the machine of FIG. 1.
FIG. 3A is a partial section view taken along line 3A—3A of FIG. 3.
FIG. 4 is a bottom view of a female assembly for molding according to the method of the present invention.
FIG. 5 is a top view of a male plug assembly for molding according to the method of the present invention.

To form the cover 130 of the desired configuration, the machine 20 includes a female assembly 32 attached to the top platen 24 and a male plug assembly 34 attached to the bottom platen 26. The female assembly 32, as seen in FIG. 3, has a rectangular base 36 secured by bolts 37 to I-beams 39 which are, in turn, connected to the top platen 24. Extending through the base 36 to provide a means to pass compressed air or draw air through the base 36 is an assembly bore 40. A fitting 41 on the base 36 provides for a connection of a hose 43 (FIG. 7) to the base 36, the hose 43 in turn communicating with the assembly bore 40.

Attached to the base 36 by bolts 42 is a top plate 44. Shims 45 disposed between the base 36 and the top plate 44 permit the top plate 44 to be spaced from the base 36 to define a planar top passageway 46 which, as seen in FIG. 3, communicates with the assembly bore 40. As best seen in FIG. 4, the top plate 44 is generally square having a wall 47 contoured to produce the desired pattern on the completed plastic part. For the cover 130, for example, the wall 47 has a series of longitudinal ribs 48 extending over a portion thereof to, as described below, fashion the prisms 146 along the outside of the front panel 138. Beveled surfaces 50 form the perimeter of the top plate 44 as illustrated in FIG. 3.

Secured to the base 36 by bolts 51 are side supports 52 and rear and front supports 53 and 54 respectively. Side plates 57 are secured to the side supports 52 by bolts 60 and have beveled ends which cooperate with the beveled surfaces 50 of the top plate 44 to define seams (not shown) which are in communication with the top passageway 46. The width of the seams may be adjusted by shims 64 on the bolts 60. As seen in FIGS. 3 and 4, the walls 66 of the side plates 57 may be contoured to form the desired pattern on the completed part. Accordingly, a portion of the walls 66 may have ribs 68 to fashion prisms 146 along the outside of the side panels 134, the remainder of the walls 66 being generally planar.

In a manner similar to the side plates 57, a rear plate 58 is secured to the rear support 53 by bolts 70. The rear plate 58 has a beveled end 71 which, in cooperation with the beveled surfaces 50 of the top wall 44, defines a seam 72 which is in communication with the top passageway 46. The width of the seam 72 may be adjusted by shims 73. As seen in FIG. 4, the rear plate 58 has a planar wall 74 to define the outside of the bottom panel 136.

In a like manner a front plate 59 is secured to the front support 54 by bolts 76. The top end 77 of the front plate 59 is beveled to cooperate with the beveled surfaces 50 of the top plate 44 to define a seam 78. Again the width of the seam 78 may be adjusted by a shim 79 on the bolts 76. As seen in FIG. 4, the front plate 59 has a planar wall 80 to fashion the outside of the top panel. Seam 78 communicates with the top passageway 46.

Accordingly, walls 66, 74 and 80 cooperate to define a cavity 56 adapted to shape the outside of the finished plastic cover 130. The seams defined between the top plate 44, side plates 57, rear plate 58 and front plate 59 provides communication between the cavity 56, top passageway 46 and assembly bore 40 to evacuate or supply compressed air to the cavity 56. Depending upon the characteristics of the plastic stock, the width of the seams may be varied so as not to draw plastic into the slits. Furthermore, the side supports 52, rear and front supports 53, 54, side plates 57, rear and front plates 58 and 59 define a co-planar lower sealing edge 81, the purposes of which will be described below.

To secure the male plug assembly 34 to the bottom platen 26, the male plug assembly 34 includes a flat platform 82 attached by bolts 83 to I-beams 84 which are in turn connected to the bottom platen 26 as shown in FIGS. 1 and 3. Typically, and as exemplified by the cover 130, the platform 82 will fashion the flange 132 or a trim-away portion of the part.

The male plug assembly 34 includes a plug body 86 having an upper end 87 and a bottom end 88. To secure the body 86 to the platform 82, bolts 89 extend through the platform 82 and into the body 86. As seen in FIG. 3, shims (not shown) disposed between the bottom end 88 and the platform 82 create a bottom passageway 90. The plug body 86 is, according to the illustrative embodiment, cubical, having walls 92 upstanding from the platform 82. It is to be understood that while the walls 92 are shown as being planar that the plug body 86 could be varied in configuration depending upon the desired finished plastic part. To form the cover 130, the walls 92 are planar to fashion the inside of the top panel and bottom and side panels 136 and 134.

Extending through the platform 82 and body 86 is a plug bore 94 which terminates at a fitting 96 at the platform 82. The fitting 96 is adapted to connect a hose 97 (FIG. 8) to evacuate air or transmit compressed air through the plug bore 94. As seen in FIG. 3, the plug bore 94 communicates with the bottom passageway 90 and terminates at a rectangular recess 98 disposed at the upper end 87 of the body 86.

To shape the inside of the front panel 138 of the cover 130, the male plug assembly 34 includes a rectangular insert 100. The insert 100 is secured to the plug body 86 by the bolts 89. The insert 100 has a contoured surface 102 adapted to generate the desired shape or configuration upon the plastic part. The surface 102, as shown in FIGS. 3, 3A and 5, has a portion thereof with ribs 104 to fashion the prisms 144 over the inside of the front panel 138 which are transverse in relation to ribs 48 of the top wall 44 of the female assembly 32. The remainder of the surface 102 is planar to fashion the cap 140 of the cover 130. As seen in FIG. 3, the insert 100 is closely received into the recess 98 so as to position the contoured surface 102 above the upper end 87 of the body 86. The space between the wall of the recess 98 and the insert 100 defines a slit 106 extending about the periphery of the insert 100. To provide communication between the slit 106 and the plug bore 94 to evacuate air from or supply compressed air to the surface 102, shims 108 interposed between the platform 82 and the plug body 86 space the insert 100 above the bottom of the recess 98 to define an insert passageway 110. Again, the width of the slit 106 and insert passageway 110 may be modified depending upon the plastic stock so that the plastic will not be drawn into the slit 106 during the double-side thermoforming thereinafter described.

Turning to FIGS. 6-13, the method for double-side thermoforming will now be described.

Figure 6:
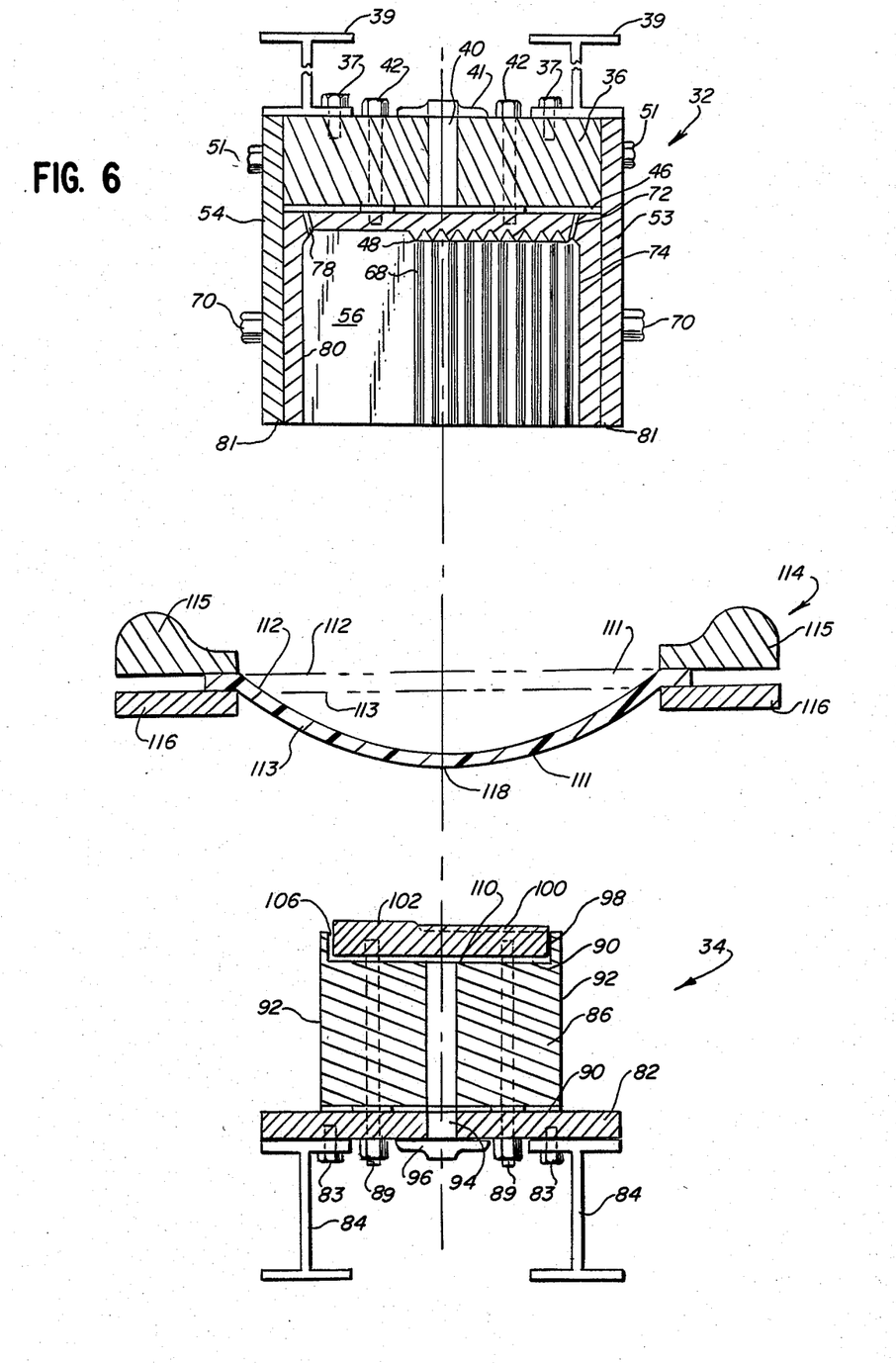
FIG. 6 is a view similar to that of FIG. 3 showing the positioning of the plastic sheet between the female assembly and the male plug.

To double-side thermoform the cover 130, a plastic sheet 111 having a top face 112 and a bottom face 113 is provided. The sheet 111 is thermoformable, translucent polycarbonate plastic having a thickness of about 0.188 inches. To hold the sheet 111 during forming the sheet 111 is secured about its periphery to a clamp frame 114. The clamp frame 114, as known by those skilled in the art, receives the sheet 111 by clamping the perimeter of the sheet 111 between upper and lower jaws 115 and 116 as shown in FIG. 6.

Once the sheet 111 has been secured to the clamp frame 114, the clamp frame 114 is positioned in the oven 28 between the top and bottom heater banks 30 and 31.

As is known, thermoformable materials such as the polycarbonate sheet 111 must be heated to a temperature at which the plastic can be formed. This temperature is not any one specific temperature but rather a temperature within a range of temperatures defining the transition region which is characteristic to each thermoformable material. At temperatures within a transition region, the plastic sheet stock does not significantly degrade and large deformations may be imposed on the plastic with relatively small forces such as by applying a pressure differential between both faces of the material. Temperatures above the transition region significantly degrade the sheet stock material and the chemical and mechanical properties of the finished product suffer. Temperatures lower than the transition region are undesirable because of large forces and rugged equipment and tooling needed such as in the case of compression molding to properly mold the plastic part. The illustrative sheet 111 of polycarbonate has a transition temperature region of between 340° to 400° F.

Within the transition region there is a variation in the plastic's resistance to deformation. Resistance to deformation has been referred to as the material's hot strength. The hot strength is low at the upper end of the transition region which means that the plastic, here sheet 111, can be easily deformed. At lower temperatures within the transition region, the hot strength increases and the material becomes more resistant to deformation. When air pressure differential is no longer able to deform the plastic sheet 111, the sheet is said to freeze-off.

Other properties of thermoformable material important to the double-sided thermoforming herein set forth is that thermoformable material, such as the polycarbonate sheet 111, have relatively low thermal conductivities. Accordingly, a significant temperature difference can be induced and maintained between the top and bottom faces 112 and 113 of the sheet 111. For example, one face may be at freeze-off while the other face remains within the transition region. Furthermore, thermoformable materials such as sheet 111 have relatively low specific heats. Therefore, thermal energy is retained within the sheet to act as a reservoir to compensate for convective and conductive heat losses which might otherwise prematurely freeze-off a face of the sheet 111.

To heat the sheet 111 the top and bottom heater banks 30 and 31 (FIGS. 1 and 2) are preferably radiant-type heaters. It is to be understood that conductive and convective heating are surface phenomenon. Energy put into a sheet at its faces only heats the interior of the sheet through conduction of heat from the surfaces. Accordingly, temperature differentials may be set up between the faces of the sheet and interior since the sheet has, as discussed above, a low thermal conductivity. The differential temperature may be minimized by heating at a slow rate; however, this is undesirable since it slows the production of plastic parts.

Radiant heating as by top and bottom heater banks 30 and 31, however, is a bulk phenomenon. Energy, at the correct wavelength, is put directly into the mass of the sheet, there being no dependence, at least theoretically, upon temperature differential to drive energy into the interior of the sheet. If the radiant heating quickly heats the sheet, any temperature gradients contributed by conduction and convection are minimized. Accordingly, the top and bottom heater banks 30 and 31 have high energy densities of from 5 to 6 kilowatts per square foot. Each heater has a surface temperature of between 1,000° F. to 1,100° F. to maximize the portion of wavelengths produced in a range of between 2.5 and 3.5 microns. This range of radiant energy wavelengths has been determined to be the range wherein bulk absorption heating is maximized for the sheet 111 of polycarbonate. While radiant heating is preferred, it is within the scope of the present invention to use convective or conductive heating.

Returning to the drawings, FIGS. 1, 2 and 6, it is seen that the sheet 111 is positioned in the oven 28 closer to the top heater bank 30 than to the bottom heater bank 31. When the sheet 111 is heated the bottom face 113 is heated to a temperature of between 340°–350° F. which is, as discussed above, at the low end of the transition region. The top face 112 is, on the other hand, heated to a temperature at the high end of the transition region of between 390° to 400° F.

The female assembly 32 is heated such that the walls of the molding cavity 56 are held at a temperature of approximately 250° F. Similarly, the plug body 86 and platform 82 are heated to and held at a temperature of approximately 375° to 400° F. and the insert 100 is heated to and held at a temperature of approximately 300° to 325° F. The heating of the female assembly 32 and plug assembly 34 may be accomplished by incorporating resistance heaters within the assemblies or by circulating a heating medium such as water, oil or the like through the assemblies.

Turning to FIG. 6 it is seen that when the sheet 111 is first positioned in the oven 28 it is planar as shown by the phantom lines, extending across the clamp frame 114. During heating of the sheet 111 it sags to a position as substantially shown in FIG. 6 by the solid lines. The sag thins the sheet 111 from a starting thickness of 0.188 inches to approximately 0.125 inches at the center of the sheet indicated as center 118. Displacement of the center 118 of the sheet 111 caused by the sag can be used to determine when the sheet 111 has been sufficiently heated.

Subsequent to heating of the sheet 111, the sheet 111 is shuttled along a trackway (not shown) or the like to a position between the female assembly 32 and plug assembly 34 as shown in FIGS. 1 and 2. It is important that the sheet 111 be shuttled and formed quickly so that the sheet 111 does not cool resulting in unnecessarily high hot strength or freeze-off of one or both of the faces.

Figure 7:
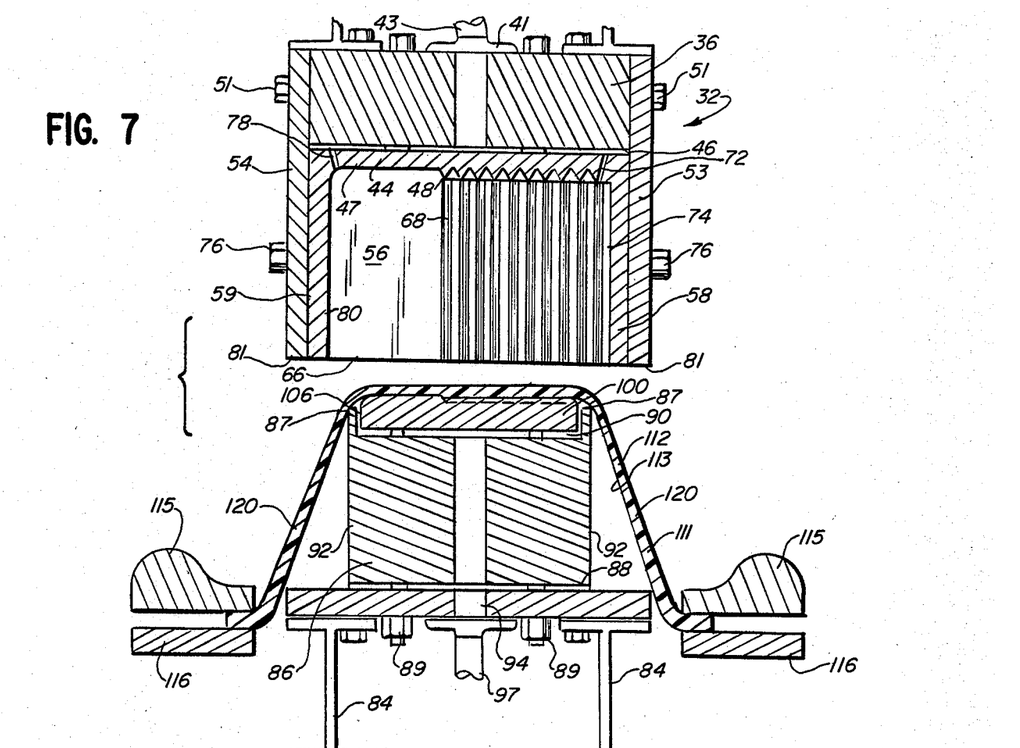
FIG. 7 shows the male plug engaging the plastic sheet for molding of one surface thereof.

To form the cover 130, the lower temperature bottom face 113 is initially formed. Accordingly, the lower platen 26 is raised as shown in FIG. 7. The raising of the bottom platen 26 causes the plug assembly 34 and more particularly upper end 87 and insert 100 to engage the bottom face 113 of the sheet 111. The bottom face 113 in effect locks onto the insert 100 and upper end 87 and, accordingly, that portion of the sheet 111 covering the upper end 87 and insert will not stretch and thin as the bottom platen 26 continues to be raised. Continued upward movement of the bottom platen 26 displaces the sheet 111 to stretch and thin bridging portions 120 which extend from the clamp frame 114 to upper end 87. As can be seen in FIG. 7, the material adjacent the clamp frame 114 thins the least.

Figure 8:
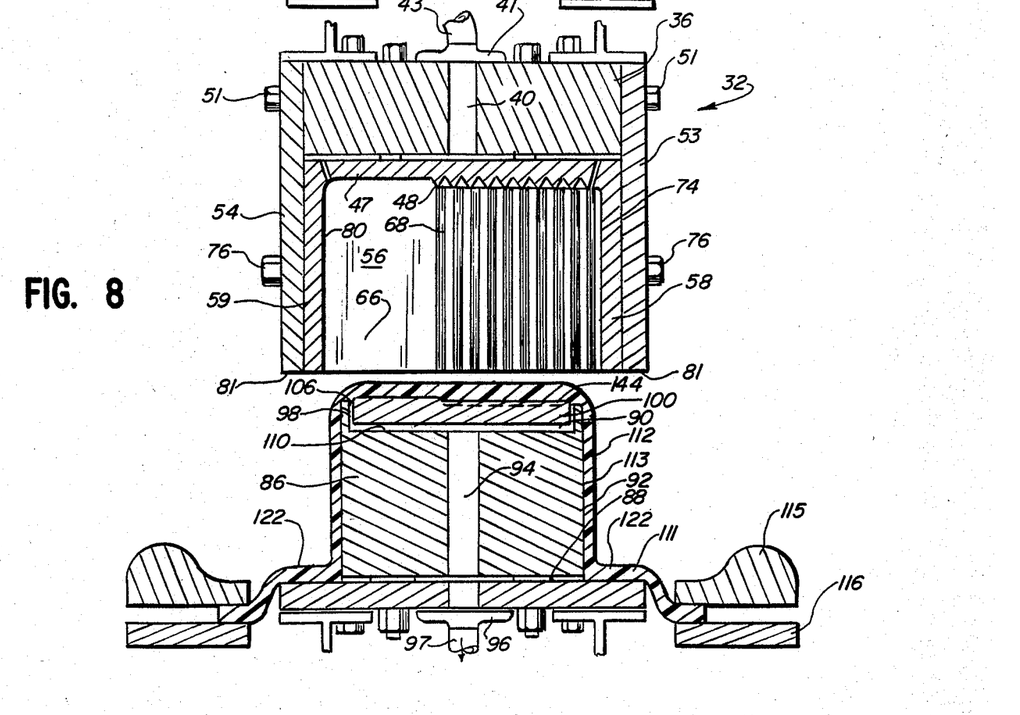
FIG. 8 is a view similar to that of FIG. 7 showing the plastic sheet conforming to the male plug and the forming of one face of the plastic.

After the sheet 111 had been displaced sufficiently as determined by the height of the plug body 86 and thinning of the sheet 111, a vacuum of about 25 inches of mercury is imposed at plug bore 94. The vacuum evacuates air through the bottom passageway 90 and slit 106 to create a pressure differential between the region above the sheet 111 as seen in FIG. 8 and the region below the sheet 111 causing the sheet 111 and more particularly the bottom face 113 to stretch and closely mate with the platform 82, plug body 86, upper end 87 and insert surface 102. Since the temperature of the insert 100 is kept at between 300° to 325° F., below the transition region of the polycarbonate sheet 111, the bottom face 113 engaging the insert 100 conforms to its surface 102 and freezes-off to form the prisms 144 along the inside of the front panel 138. However, since the plug body 86 and platform are kept at temperatures within the transition region i.e., 375° to 400° F., the portions of the bottom face 113 contacting the plug walls 92 to form the flange 132 and inside of the top, and bottom and side panels 136 and 134 remain within the transition region. Since the sheet 111, as discussed above, has a low thermal conductivity and high specific heat, the freeze-off of the bottom face 113 does not freeze-off the top face 112.

Figure 9:
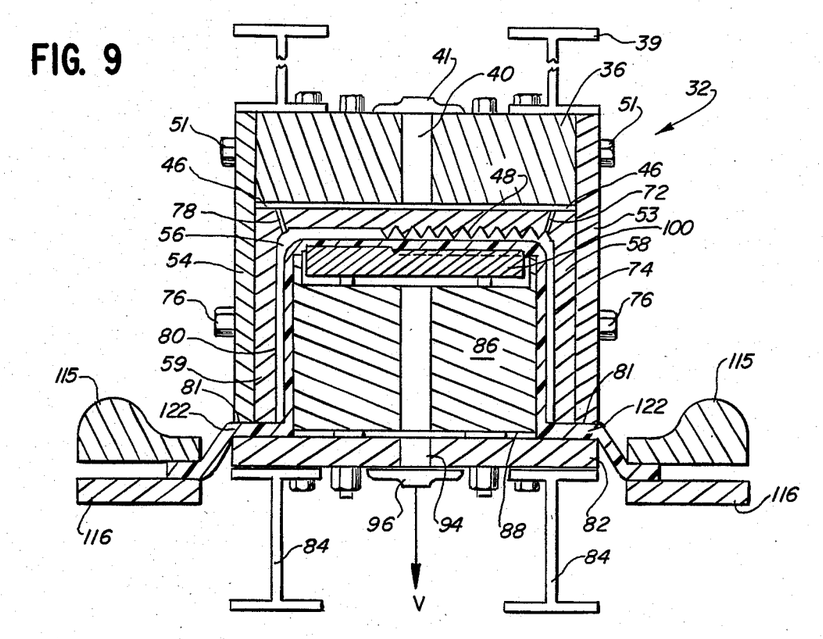
FIG. 9 shows the female assembly and male plug assembly closed for forming of the other face of the plastic.
Figure 10:
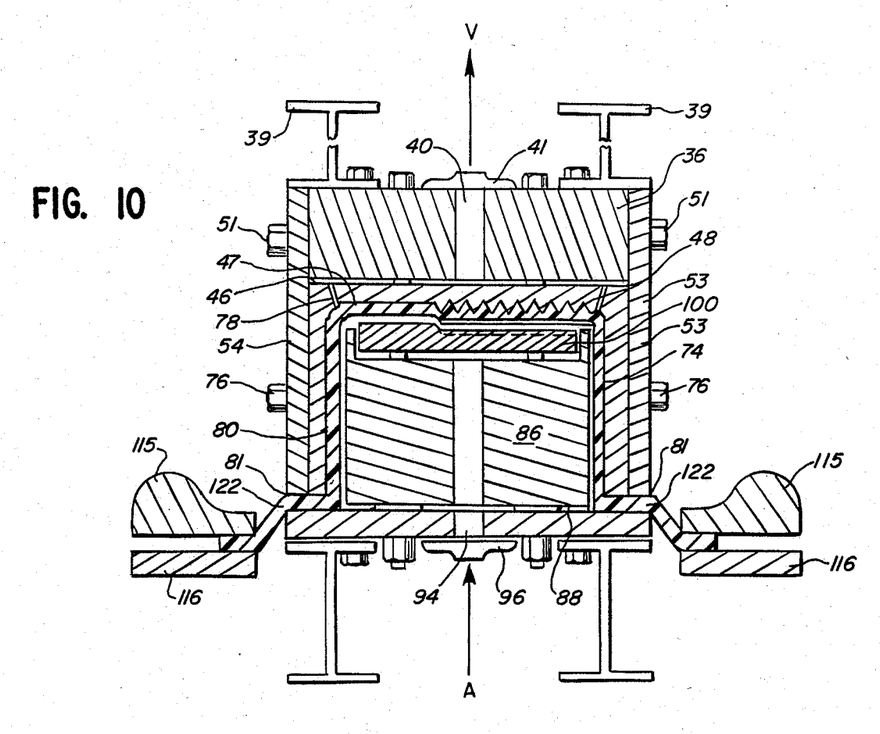
FIG. 10 is a view similar to that of FIG. 9 showing the plastic sheet removed from the male plug assembly and received by the female assembly for molding of the other face of the plastic.

To mold the top face 112 and fashion the outside of the cover 130, the female assembly 32 is lowered to receive the plug body 86 and insert 100 into the molding cavity 56 as shown in FIG. 9. When the female assembly 32 is fully lowered, the sealing edge 81 of the female assembly 32 engages the portion 122 of the sheet 111 defining the flange 132 to seal the cavity 56 from the environment. After the female assembly 32 has been lowered to seal the cavity 56, the vacuum in plug bore 94 is replaced by compressed air at approximately 80 psig while a vacuum again of about 25 inches of mercury is imposed upon assembly bore 40 to evacuate air from the cavity 56. The pressure differential created by the pressure at the bottom face 113 and the vacuum imposed upon the top face 112 via the assembly bore 40, top passageway 46 and seams 72 moves the sheet 111 away from the plug body 86, upper end 87 and insert 100 to a position against the surfaces 66, 74 and 80 which define the cavity 56 as shown in FIG. 10. Accordingly, the top surface 112 is drawn into intimate contact and conforms to the contour of the aforementioned walls defining the cavity 56 to form the outside surface of the cover 130. The planar walls 74 and 80 form the outside of the bottom panel 136 and top panel whereas the walls 47 and 66 including ribs 48 and 68 fashion the outside of the front and side panels 138 and 134 and prisms 146. Since the bottom face 113 forming the inside of the front panel 138 including prisms 144 was frozen-off, the thermoforming of the top face 112 including the prisms 146 does not distort the transverse prisms 144. Very little thinning of the sheet 111 occurs since the sheet 111 is not moving significant distances. When the top face 112 is in intimate contact with the aforementioned walls, the top face 112 freezes-off since the female assembly is maintained at a temperature of 250° F. well below the transition region of the polycarbonate sheet 111.

It is to be noted that significant clearances are provided between the surfaces defining the cavity 56 and the plug body 86 and insert 100 accordingly precision tooling is not required. Furthermore, since the top face 112 of the sheet 111 is molded at temperatures within the transition region, the movement of the sheet 111 can be accomplished through relatively low pressure differentials dispensing with the need to construct rugged female and male plug assemblies 32 and 34.

Figure 11:
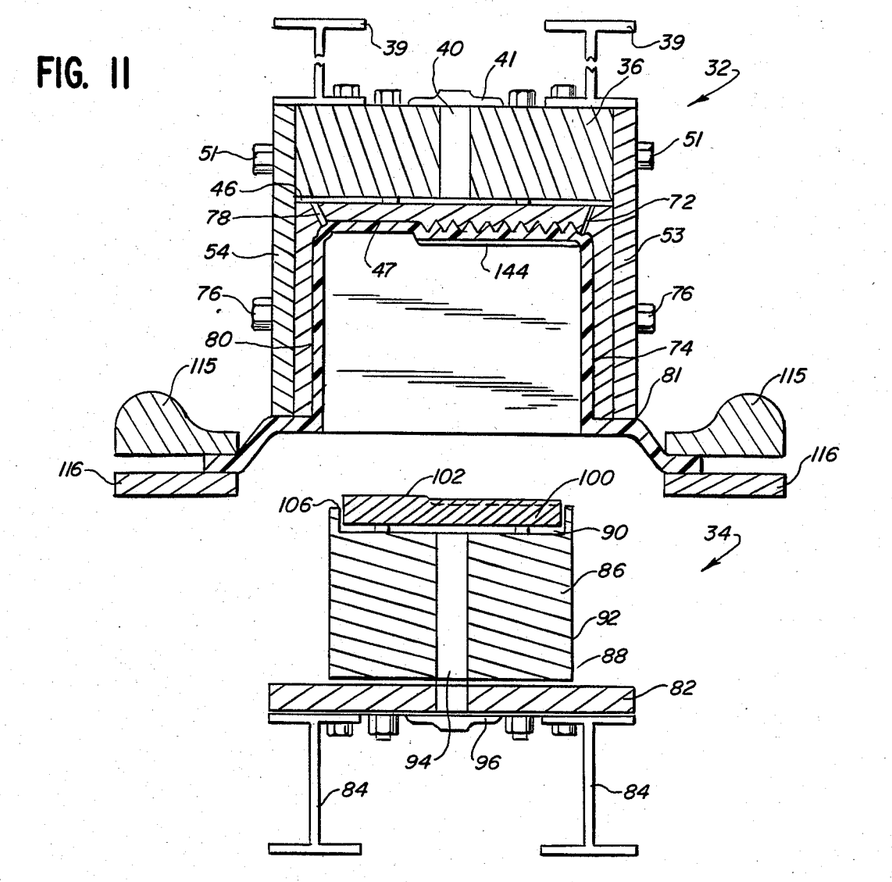
FIG. 11 illustrates the male plug assembly moved away from the female assembly.
Figure 12:
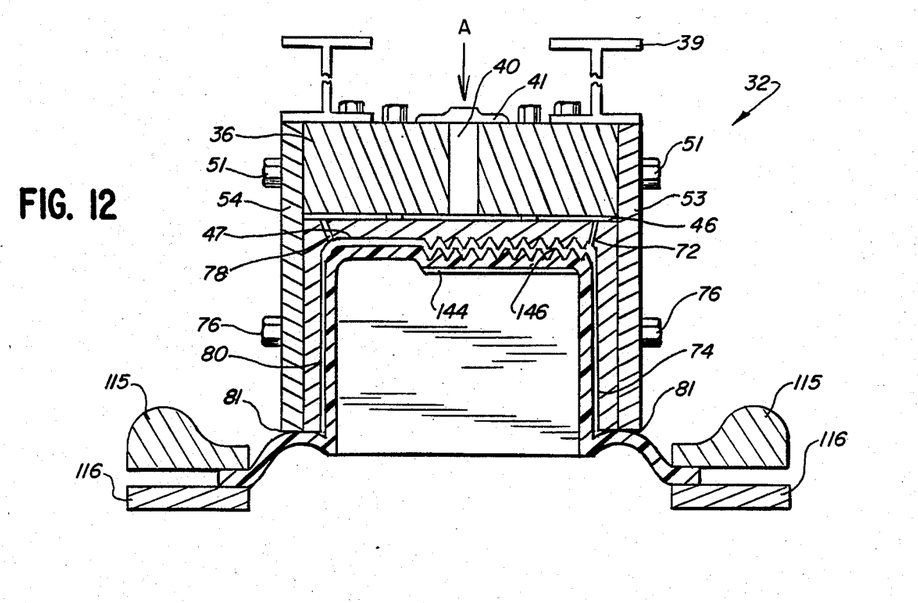
FIG. 12 is a view similar to that of FIG. 11 showing the ejection of the completed part from the female assembly.
Figure 13:
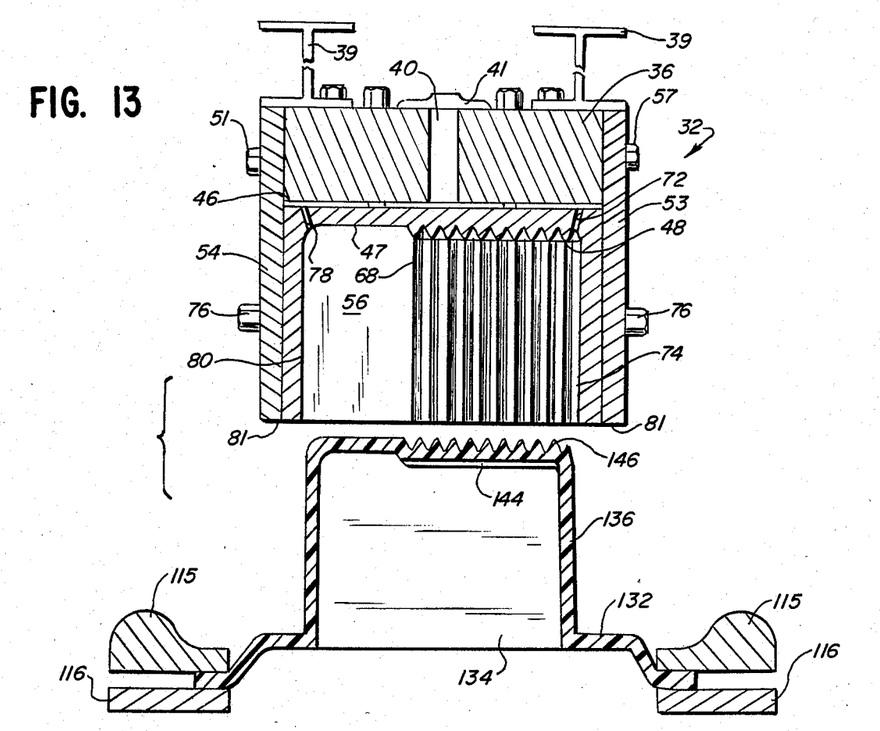
FIG. 13 is a view similar to that of FIG. 12 showing the plastic part completely separated from the female assembly.

After the top surface 112 has been formed, the male plug assembly 34 is lowered as shown in FIG. 11 and compressed air at about 80 psig is injected through assembly bore 40 as illustrated in FIG. 12 to free the sheet 111 from the cavity 56 as shown in FIG. 13.

While I have shown and described certain methods and embodiments of the invention of this application, it is to be understood that it is subject to many modifications without departing from the spirit and scope of the claims hereinafter set forth.

I claim:

1. A method for double-side thermoforming a sheet of plastic with opposite faces comprising:

heating said plastic sheet to its transition temperature range;

forming at least a portion of one face of said plastic sheet by causing a contour-forming first surface to contact said one face and urging said one face portion against the first surface to cause said one face portion to conform to said first surface;

freezing-off said one face while maintaining at least a portion of the other face of said sheet at least partially aligned oppositely of said one face portion at a temperature within the transition temperature range;

forming said portion of the other face of said sheet by causing said portion of said other face of said sheet to contact a contour-forming second surface and urging said other face portion of said sheet against the second surface to cause said other face portion to conform to said second surface while substantially maintaining the frozen-off configuration of said one face portion; and freezing-off said other face portion.

2. The method of claim 1 wherein said heating includes heating said one face to a first temperature and heating said other face to a higher temperature.

3. The method of claim 1 wherein said forming of said one face includes bringing a contour forming first surface having a temperature lower than said transition temperature range into contact with said one face and creating a pressure differential to cause said one face to conform to said surface and freeze-off.

4. The method of claim 1 wherein said forming of the other face includes bringing said other face of said plastic into contact with a contour forming second surface having a temperature below said transition temperature range and creating a pressure differential to cause said other face to conform to said second surface and freeze-off.

5. A method for double-side thermoforming a sheet of plastic with opposite faces comprising:

heating said plastic sheet to its transition temperature range;

forming one face of said plastic including bringing a male plug having a contoured insert and heated to at least said transition temperature range to prevent freeze-off of the engaging portions of asid one face into engagement with said one face and creating a pressure differential to cause said plastic to conform to said plug and insert, said insert maintained at a temperature below said transition temperature range to freeze-off engaging portions of said one face; and forming the other face of said plastic including bringing a female assembly to a position adjacent to said plastic, said plug received into a cavity of said female assembly having contoured walls and creating a pressure differential to cause said other face to conform to said cavity walls and freeze-off.

6. The method of claim 5 wherein said cavity walls are maintained at a temperature below said transition temperature range fo freeze-off conforming portions of said other face.

7. The method of claim 5 wherein said heating of said plastic comprises heating of said one face to a first temperature within the transition range and heating said other face to a higher temperature.

* * * * *